United States Patent [19]

Katchman et al.

[11] 4,073,765
[45] Feb. 14, 1978

[54] FILLED POLYPHENYLENE ETHER COMPOSITIONS HAVING IMPROVED TOUGHNESS

[75] Inventors: Arthur Katchman, Delmar; Gim Fun Lee, Jr., Albany, both of N.Y.

[73] Assignee: General Electric Company, Pittsfield, Mass.

[21] Appl. No.: 753,510

[22] Filed: Dec. 21, 1976

[51] Int. Cl.$^2$ .................. C08G 65/44; C08K 3/24
[52] U.S. Cl. .................. 260/40 R; 260/860; 260/873
[58] Field of Search .................. 260/40 R, 860, 873, 260/42

[56] References Cited

U.S. PATENT DOCUMENTS

| | | | |
|---|---|---|---|
| 3,221,080 | 11/1965 | Fox | 260/860 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,383,435 | 5/1968 | Cizek | 260/874 |
| 3,431,238 | 3/1969 | Borman | 260/860 X |
| 3,644,267 | 2/1972 | Jackson et al. | 260/873 X |
| 3,812,077 | 5/1974 | Hobbs | 260/40 R |
| 4,011,193 | 3/1977 | Wambach | 260/40 R |

*Primary Examiner*—Sandra M. Person
*Attorney, Agent, or Firm*—Morgan, Finnegan, Pine, Foley & Lee

[57] ABSTRACT

Filled thermoplastic compositions are provided which comprise, in admixture, a polyphenylene ether resin, a styrene resin, a reinforcing amount of a titanate filler and an adipic acid based polyester in an amount at least sufficient to provide enhanced toughness, as measured by impact strength and tensile elongation, in the molded compositions.

8 Claims, No Drawings

FILLED POLYPHENYLENE ETHER COMPOSITIONS HAVING IMPROVED TOUGHNESS

This invention relates to reinforced polyphenylene ether compositions which are capable of being molded to shaped articles of enhanced impact strength and enhanced tensile elongation. More particularly, the invention provides thermoplastic molding compositions based on an intimate admixture of a polyphenylene ether resin, a styrene resin, preferably rubber modified high impact polystyrene, a filler comprised of titanate whiskers and an adipic acid polyester to provide enhanced toughness in articles molded from the compositions.

BACKGROUND OF THE INVENTION

Polyphenylene ether resins comprise a class of thermoplastics which are characterized by outstanding physical properties, including hydrolytic stability, excellent dielectic properties, broad temperature use range and dimensional stability at elevated temperatures. They can be made by a variety of catalytic and non-catalytic processes from the corresponding phenols or reactive derivatives thereof. In general, they are prepared by the oxidative coupling of a phenolic compound with a complex metal catalyst. By way of illustration, descriptions of the preparation of polyphenylene ether resins are contained in Hay, U.S. Pat. Nos. 3,306,874 and 3,306,875, and in Stamatoff, U.S. Pat. Nos. 3,257,357 and 3,357,358, which are incorporated herein by reference.

In the Hay patents, the polyphenylene ether resins are prepared by oxidative coupling comprising passing an oxygen-containing gas through a reaction solution of a phenol and a metal-amine complex catalyst. In the Stamatoff patents, the polyphenylene ethers are prepared by reacting the corresponding phenolate ion with an initiator, e.g., an acid peroxide, in the presence of a complexing agent.

The Cizek patent, U.S. Pat. No. 3,383,435, discloses compositions of polyphenylene ether resins and styrene resins. The thermoplastic compositions disclosed therein include rubber-modified styrene resins. Such compositions are important commercially because they provide improvement in the melt processability of the polyphenylene ether and improvements in the impact resistance of articles molded from the compositions, in addition to an upgrading of many other properties. The disclosure of the aforementioned Cizek patent is incorporated herein by reference.

Fillers are often included in these polyphenylene ether resin compositions for a variety of reasons, e.g., as reinforcers to increase stiffness, as well as to enhance other physical properties. Of special importance herein are filled polyphenylene ether/polystyrene compositions using titanate-type filler materials, such as potassium titanate whiskers. The presence of a filler in most cases, including titanate filled polyphenylene ether resin compositions, results in a decrease in toughness properties, i.e., impact strength and/or tensile elongation.

It has now been surprisingly discovered that the toughness of compositions of a polyphenylene ether, a polystyrene and a titanate filler can be improved by the presence of an adipic acid based polyester. The compositions of the invention, when molded, exhibit enhanced impact strength and tensile elongation in comaprison with titanate filled polyphenylene ether/polystyrene molding compositions without the polyester additive of the invention.

DESCRIPTION OF THE INVENTION

This invention provides a filled thermoplastic molding composition which, after molding, has enhanced impact strength and enhanced tensile elongation, the composition comprising an admixture of
 (a) a polyphenylene ether resin;
 (b) a styrene resin;
 (c) a titanate filler; and
 (d) an adipic acid based polyester in an amount at least sufficient to provide enhanced impact strength and enhanced tensile elongation in the molded composition.

Illustrative of the polyphenylene ether resins (a) are those having the repeating structural unit of the formula:

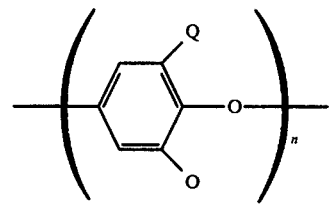

wherein the oxygen ether atom of one unit is connected to the benzene nucleus of the next adjoining unit, n is a positive integer and is at least 50, and each Q is a monovalent substitutent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

An especially preferred class of polyphenylene ether resins for the compositions of this invention includes those of the above formula wherein each Q is alkyl, most preferably having from 1 to 4 carbon atoms. Illustratively, members of this class include poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like. Especially preferred is poly(2,6-dimethyl-1,4-phenylene)ether, preferably having an intrinsic viscosity of about 0.45 deciliters per gram (dl./g.) as measured in chloroform at 30 C.

Illustrative of the styrene resins contemplated herein for component (b) are those having at least 25 percent, by weight, polymer units derived from the compound having the formula:

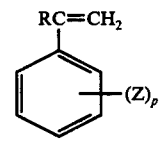

wherein R is hydrogen, lower alkyl or halogen; Z is a member selected from the group consisting of vinyl, hydrogen, chlorine and lower alkyl; and p is a whole number equal to from 0 to 5. The term "styrene resin" as used throughout this disclosure and in the claims and defined by the above formula includes, by way of example, homopolymers, such as polystyrene and polychlorostyrene, the modified polystyrenes, such as rubber-modified polystyrenes and the styrene containing copolymers such as the styrene-acrylonitrile copolymers (SAN), styrene-butadiene copolymers, styrene maleic anhydride, styrene-acrylonitrilebutadiene copolymers (ABS) polyα-methylstyrene, copolymers of ethylvinyl benzene and divinylbenzene, and the like.

The preferred styrene resin component herein is rubber-modified, high impact styrene resin, such as polystyrene which has been modified with natural and synthetic rubber, such as polybutadiene, polyisoprene, rubbery copolymers of dienes with other comonomers, such as styrene, acrylonitrile, acrylic esters and the like, including block copolymers of the A-B-A and A-B type wherein A is a vinyl aromatic, such as styrene, and B is a diene such as butadiene, as well as EPDM rubber and the like. Most preferably, the polystyrene is modified with a butadiene rubber.

The filler (c) can be any conventional titanate filler material. These are known in the art and described in the literature. Preferably, the filler is comprised of whiskers of potassium titanate.

Polyester (d) is a poly(adipate) of preferably relatively low molecular weight, e.g., 1,000–8,000, which can be prepared by the polycondensation of a glycol with adipic acid. The polymer chain is preferably terminated with hydroxyl groups. In general, the polymerization reaction is carried out batchwise in stirred glass-lined or stainless steel vessels furnished with the usual ancillary equipment for metering, mixing and introducing starting materials, purging with inert dry gas, heating, condensing volatile by-products such as water or glycols, and, where required, operating under reduced pressure. The course of polymerization is followed by measuring the volume of distillation and from the measurement of end groups, e.g., hydroxyl groups, and viscosity in samples drawn from the reaction mixture. The reaction is interrupted when the product has attained the desired molecular weight.

An especially preferred polyester of this type is Santicizer 411, available commercially from Monsanto Industrial Chemicals Co., St. Lous, Mo. Santicizer 411 is a low-cost polymeric plasticizer having the following properties:

| | |
|---|---|
| Acidity (meq/100 gm.max.) | 1.0 |
| Appearance | Light yellow viscous liquid some solids on standing |
| Color (APHA) [max.] | 100 (50 ml:ml in 95% Ethanol) |
| Moisture (KF in Methanol) %, max. | 0.15 |
| Odor | Slight characteristic |
| Refractive Index (at 25° C) | 1.4772 |
| Specific Gravity (25°/25° C) | 1.104–1.110 |
| Density (at 25° C) ca.lbs./gal. | 9.20 |
| Pour Point (° C) | 21.1 |
| Viscosity (stokes) | |
| at 25° C | 72–88 |
| at 50° C (typical) | 12.0 |
| at 90° C (typical) | 1.70 |
| Flash Point (C.O.C.) [° F.] | 540 |
| Solubility in Water at 25° C, % | Practically insoluble |

The amounts of the components can vary within wide ranges. In general, the polyphenylene ether resin (a) can comprise from about 5 to about 90 parts by weight, preferably, from about 30 to about 60 parts by weight based on the weight of the total composition. The styrene resin (b) can comprise from about 5 to about 90, preferably from about 40 to about 70 parts by weight of the total. The amount of the filler (c) can vary widely, e.g., from about 5 to about 90, preferably from about 10 to about 50 parts by weight of the total composition.

The polyester component (d) can be present in relatively small amounts, e.g., from about 1 part by weight per 100 parts of the total resinous components. Even with such small amounts, marked improvements in impact strength and tensile elongation are obtained. Preferably, the polyester is employed in an amount ranging from about 2 to about 30 parts by weight per 100 parts by weight of resin.

The compositions of this invention can be prepared by any conventional method. For example, they may be prepared by tumbling the components, extruding the resulting mixture into a continuous strand, chopping the strand into pellets and thereafter molding the pellets into the desired shape.

The thermoplastic compositions of this invention are useful for all purposes for which polyphenylene ether compositions have heretofore been used. See, for example, the above-mentioned patent of Cizek. The present compositions may be converted to films, fibers, molded articles and the like by conventional methods.

The following examples are presented for an illustrative purpose only and are not to be construed as limiting the invention.

EXAMPLES 1–4

The following components are intimately admixed in a blender. After blending, each composition is extruded through a screw extruder with the extrusion temperature maintained between 450° and 600° F. The strands emerging from the extruder are cooled, chopped and molded into test bars using standard procedures, and tested for elongation percent and impact strength according to ASTM test methods. All parts are by weight.

| Components | 1 | 2 | 3 | 4 |
|---|---|---|---|---|
| polyphenylene ether resin[a] | 35 | 35 | 35 | 35 |
| polystyrene resin[b] | 65 | 65 | 65 | 65 |
| potassium titanate filler | 10 | 10 | 20 | 20 |
| adipic acid polyester[c] | — | 5 | — | 5 |

[a] poly(2,6-dimethyl-1,4-phenylene ether), PPO, General Electric Company
[b] FG 834, Foster-Grant Co.
[c] Santicizer 411, Monsanto Chem. Co.

The test results are shown in the table below.

Table.

| | Physical Properties | | |
|---|---|---|---|
| Example | Tensile Elongation (%) | Izod Impact Strength (ft.lb./in.n.) | Gardner Impact Strength (in.lbs.) |
| 1 | 46 | 1.0 | 22 |
| 2 | 57 | 1.5 | 72 |
| 3 | 18 | 0.61 | 21 |

Table.-continued

| Example | Physical Properties | | |
|---|---|---|---|
| | Tensile Elongation (%) | Izod Impact Strength (ft.lb./in.n.) | Gardner Impact Strength (in.lbs.) |
| 4 | 44 | 0.66 | 42 |

It is shown that the compositions according to the invention, i.e., those which include an adipic acid polyester, exhibit higher values of tensile elongation and impact strength than the compositions which do not include the polyester as a component.

Other modifications and variations are possible in the light of the above teachings. It is, therefore, to be understood that changes may be made in the particular embodiment described above which are within the full intended scope of this invention as defined in the appended claims.

We claim:

1. A filled thermoplastic molding composition which, after molding, has enhanced impact strength and enhanced tensile elongation, said composition comprising in admixture:
   (a) a polyphenylene ether resin;
   (b) a styrene resin;
   (c) a titanate filler; and
   (d) an adipic acid based polyester in an amount at least sufficient to provide enhanced impact strength and enhanced tensile elongation in the molded article.

2. A composition as defined in claim 1 wherein the polyphenylene ether resin (a) is of the formula

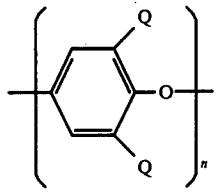

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

3. A composition as defined in claim 1 wherein the styrene resin (b) is one having at least 25 percent, by weight, polymer units derived from a monomer having the formula:

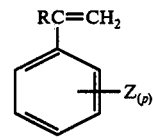

wherein R is selected from the group consisting of hydrogen, lower alkyl and halogen, Z is a member selected from the group consisting of hydrogen, lower alkyl, chlorine and vinyl, and p is a number from 0 to 5.

4. A composition as defined in claim 1 wherein said adipic acid based polyester is an hydroxy-terminated polymer.

5. A composition as defined in claim 1 which contains from about 5 to about 90 parts by weight of said polyphenylene ether resin, from about 90 to about 5 parts by weight of said styrene resin, from about 10 to about 50 parts by weight of said titanate reinforcing filler, and from about 2 to about 30 parts by weight of said polyester resin.

6. A composition as defined in claim 1 wherein said styrene resin (b) is a rubber-modified high impact polystyrene.

7. A composition as defined in claim 1 wherein said polyphenylene ether (a) is poly(2,6-dimethyl-1,4-phenylene) ether.

8. A composition as defined in claim 1 wherein the titanate filler consists of potassium titanate whiskers.

* * * * *

UNITED STATES PATENT AND TRADEMARK OFFICE
CERTIFICATE OF CORRECTION

PATENT NO. : 4,073,765
DATED : February 14, 1978
INVENTOR(S) : Arthur Katchman and Gim Fun Lee, Jr.

It is certified that error appears in the above-identified patent and that said Letters Patent are hereby corrected as shown below:

Column 1, line 31, "3,357,358" should read --3,257,358--.

Signed and Sealed this

Sixth Day of June 1978

[SEAL]

Attest:

RUTH C. MASON
Attesting Officer

DONALD W. BANNER
Commissioner of Patents and Trademarks